United States Patent
Ito et al.

(10) Patent No.: US 10,749,411 B2
(45) Date of Patent: Aug. 18, 2020

(54) ROTARY ELECTRIC MACHINE

(71) Applicant: HONDA MOTOR CO., LTD., Tokyo (JP)

(72) Inventors: Yuta Ito, Saitama (JP); Tomokazu Naito, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 16/223,482

(22) Filed: Dec. 18, 2018

(65) Prior Publication Data

US 2019/0190350 A1 Jun. 20, 2019

(30) Foreign Application Priority Data

Dec. 19, 2017 (JP) .................. 2017-243001

(51) Int. Cl.
*H02K 9/19* (2006.01)
*H02K 7/00* (2006.01)
(Continued)

(52) U.S. Cl.
CPC ................. *H02K 9/19* (2013.01); *B60K 6/26* (2013.01); *H02K 1/32* (2013.01); *H02K 7/003* (2013.01);
(Continued)

(58) Field of Classification Search
CPC . B60K 6/26; B60K 6/36; B60K 6/387; B60K 6/40; B60K 6/405; B60K 6/442;
(Continued)

(56) References Cited

U.S. PATENT DOCUMENTS

2004/0135461 A1  7/2004  Miyake et al.
2004/0145246 A1  7/2004  Nakano et al.
(Continued)

FOREIGN PATENT DOCUMENTS

| CN | 1515060 A | 7/2004 |
| CN | 1784818 A | 6/2006 |
| CN | 101873018 A | 10/2010 |
| CN | 102810943 A | 12/2012 |

(Continued)

OTHER PUBLICATIONS

Jul. 1, 2020, Chinese Office Action issued for related CN application No. 201811529059.4.

*Primary Examiner* — Alex W Mok
(74) *Attorney, Agent, or Firm* — Paratus Law Group, PLLC

(57) ABSTRACT

A rotary electric machine includes a rotor, a stator which is disposed on an outer circumferential side of the rotor and includes a stator core and a coil, a first cooling mechanism which supplies a coolant to the coil from an outer circumferential side of the stator, and a second cooling mechanism which supplies a coolant to the coil from an inner circumferential side of the stator. The coil includes a plurality of segment cods, each including a pair of leg portions, and a connection portion connecting one end sides of the leg portions. A close-side coil end constituted by the connection portion and an open-side coil end constituted by the lea portions are provided on respective end sides of the stator core. A supply amount of the coolant supplied from the second cooling mechanism is larger to the close-side coil end than to the open-side coil end.

8 Claims, 8 Drawing Sheets

(51) Int. Cl.
*B60K 6/26* (2007.10)
*H02K 16/00* (2006.01)
*H02K 1/32* (2006.01)
*H02K 7/116* (2006.01)
*B60K 6/36* (2007.10)
*B60K 6/40* (2007.10)
*B60K 6/387* (2007.10)

(52) U.S. Cl.
CPC ............. *H02K 7/006* (2013.01); *H02K 7/116* (2013.01); *H02K 16/00* (2013.01); *B60K 6/36* (2013.01); *B60K 6/387* (2013.01); *B60K 6/40* (2013.01); *B60Y 2200/92* (2013.01); *B60Y 2306/05* (2013.01); *B60Y 2400/60* (2013.01)

(58) Field of Classification Search
CPC ............ B60Y 2200/92; B60Y 2306/05; B60Y 2400/60; H02K 16/00; H02K 1/32; H02K 7/003; H02K 7/006; H02K 7/116; H02K 9/19; F16H 57/043; F16H 57/0476
USPC .......................................................... 310/54
See application file for complete search history.

(56) References Cited

U.S. PATENT DOCUMENTS

| 2004/0145252 | A1 | | 7/2004 | Arimitsu et al. | |
|---|---|---|---|---|---|
| 2007/0024129 | A1 | | 2/2007 | Pfannschmidt et al. | |
| 2010/0270094 | A1 | | 10/2010 | Nakayama et al. | |
| 2011/0156510 | A1 | * | 6/2011 | Okada | H02K 1/20 |
| | | | | | 310/54 |
| 2011/0158510 | A1 | | 6/2011 | Aguilar et al. | |
| 2012/0091838 | A1 | | 4/2012 | Miyamoto et al. | |
| 2014/0125165 | A1 | * | 5/2014 | Miyamoto | H02K 1/32 |
| | | | | | 310/54 |
| 2016/0043619 | A1 | * | 2/2016 | Maekawa | H02K 16/04 |
| | | | | | 310/156.08 |
| 2016/0322876 | A1 | * | 11/2016 | Horii | H02K 3/14 |

FOREIGN PATENT DOCUMENTS

| CN | 103580383 A | | 2/2014 | |
|---|---|---|---|---|
| JP | 2003143810 A | * | 5/2003 | |
| JP | 2010259207 A | * | 11/2010 | ............... B60K 6/48 |
| JP | 2011-142788 A | | 7/2011 | |
| JP | 2012090415 A | * | 5/2012 | |
| JP | 2014107876 A | * | 6/2014 | |

* cited by examiner

ROTARY ELECTRIC MACHINE

CROSS-REFERENCE TO RELATED APPLICATIONS

The present application claims the benefit of priority of Japanese Patent Application No. 2017-243001, filed on Dec. 19, 2017, the content of which is incorporated herein by reference.

TECHNICAL FIELD

The present invention relates to a rotary electric machine to be mounted on an electric vehicle or the like.

BACKGROUND ART

A rotary electric machine is mounted on an electric vehicle or the like. In the rotary electric machine, it is necessary to cool a coil arranged in a stator in order to prevent performance deterioration due to heat generation thereof.

As a cooling structure of the stator, a coolant dropping type cooling structure is known in which a coolant is dropped from a coolant pipe disposed above the stator to a coil end of the stator, and the coolant spreads on the coil end to cool the stator.

In the coolant dropping type cooling structure, the coolant spreads following the shape of the coil due to gravity, and thus the lower side of the coil cannot be cooled, which results in a large temperature distribution in the coil. In particular, in a stator coil constituted by connecting many segment coils, the structure is different between a coil end provided on one end side of the stator core and a coil end provided on the other end side, so that the temperature distribution in the coil may be particularly large on either side. Therefore, it is conceivable to increase the flow of the dropping coolant to ensure the cooling performance. However, increasing the capacity of a pump for supplying a coolant causes increase in the weight of the pump, increase in energy consumption, increase in the number of coolant dropping pipes, and the like, which increases the cost.

Another cooling structure of a stator is an axial cooling structure. JP-A-2011-142788, for example, discloses that a first discharge hole is formed in a coolant flow path provided between a wall surface of an end plate and an end surface of a rotary core, and a discharge groove having a second discharge hole is formed in a circumferential shape on an outer circumferential side of the coolant flow path, so that the coil is cooled by the coolant discharged from the first and second discharge holes.

In the cooling structure of an electric motor of JP-A-2011-142788, when the structure is different between a coil end provided on one end side of a stator core and a coil end provided on the other end side thereof, it is difficult to uniformly cool the one end side and the other end side of the stator core.

SUMMARY

Accordingly, an aspect of the present invention provides a segment coil type rotary electric machine excellent in cooling performance.

According to an embodiment of the present invention, there is provided a rotary electric machine including:

a rotor;
a stator which is disposed on an outer circumferential side of the rotor and includes a stator core and a coil;
a first cooling mechanism which supplies a coolant to the coil from an outer circumferential side of the stator; and
a second cooling mechanism which supplies a coolant to the coil from an inner circumferential side of the stator,
wherein the coil includes a plurality of segment coils, each including a pair of leg portions, and a connection portion connecting one end sides of the pair of leg portions,
wherein a close-side coil end constituted by the connection portion is provided on one end side of the stator core,
wherein an open-side coil end constituted by the leg portions is provided on the other end side of the stator core, and
wherein a supply amount of the coolant supplied from the second cooling mechanism is larger to the close-side coil end than to the open-side coil end.

According to another embodiment of the present invention, there is provided a rotary electric machine including:

a rotor;
a stator which is disposed on an outer circumferential side of the rotor and includes a stator core and a coil;
a first cooling mechanism which supplies a coolant to the coil from an outer circumferential side of the stator; and
a second cooling mechanism which supplies a coolant to the coil from an inner circumferential side of the stator,
wherein the coil includes a plurality of segment coils, each including a pair of leg portions, and a connection portion connecting one end sides of the pair of leg portions,
wherein a close-side coil end constituted by the connection portion is provided on one end side of the stator core,
wherein an open-side coil end constituted by the leg portions is provided on the other end side of the stator core, and
wherein a coolant is supplied from the second cooling mechanism only to the close-side coil end.

According to the above configuration, although the first cooling mechanism which supplies the coolant to the coil from the outer circumferential side of the stator has difficulty in spreading the coolant to the close-side coil end constituted by the connection portion, by actively supplying the coolant to the close-side coil end with the second cooling mechanism which supplies the coolant to the coil from the inner circumferential side of the stator, it is possible to appropriately spread the coolant to the close-side coil end on one end side of the stator core and the open-side coil end on the other end side.

DETAILED DESCRIPTION

Hereinafter, a rotary electric machine according to an embodiment of the invention will be described with reference to the accompanying drawings.

First, a vehicle driving device including a rotary electric machine according to the embodiment of the invention will be described.

Figure 1:
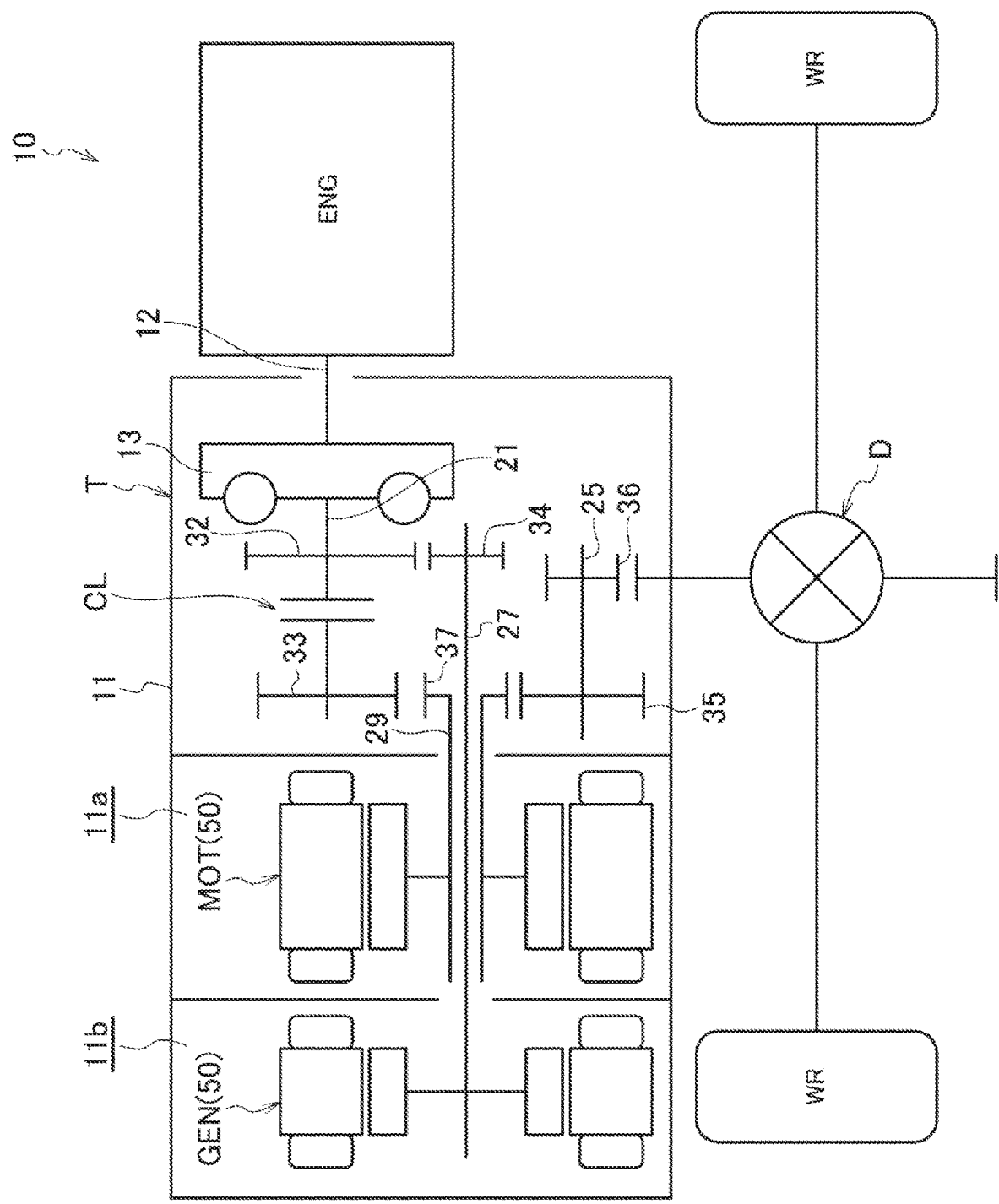
FIG. 1 is a schematic configuration diagram of a vehicle driving device including a rotary electric machine according to an embodiment of the invention.

As illustrated in FIG. 1, a vehicle driving device 10 including the rotary electric machine of the embodiment includes an engine ENG which is a driving source, a motor MOT, an electric generator GEN, and a transmission mechanism T. The motor MOT and the generator GEN are respectively disposed in a motor accommodation space 11a and a generator accommodation space 11b provided adjacent to each other in a case 11 to have rotation axes on the same straight line. The motor MOT and the generator GEN are connected to a battery (not illustrated) via a control device (not illustrated), so that electric power can be supplied from the battery and energy can be regenerated to the battery.

In the transmission mechanism T, an input shaft 21 which is disposed on the same straight line as an engine output shaft 12 of the engine ENG and connected to the engine output shaft 12, a generator shaft 27 which is directly connected to the generator GEN, a motor shaft 29 which is directly connected to the motor MOT, and an output shaft 25 which is connected to a differential device D are arranged in parallel. The generator shaft 27 is inserted within the motor shaft 29 so as to be relatively rotatable. In FIG. 1, reference numeral 13 denotes a damper which operates to reduce the shock when the power of the engine ENG is input to the input shaft 21.

In the input shaft 21, a first driving gear 32 and a second driving gear 33 are provided from the engine ENG side to the motor MOT side in this order, and further a clutch CL is provided between the first driving gear 32 and the second driving gear 33. By releasing or engaging the clutch CL, the first driving gear 32 and the second driving gear 33 become a cut-off state or a connected state.

The generator shaft 27 is provided with a first driven gear 34 which meshes with the first driving gear 32 provided on the input shaft 21. Therefore, the engine ENG connected to the input shaft 21 and the generator GEN connected to the generator shaft 27 are connected such that power can be transmitted and electric power can be generated with the generator GEN by the power of the engine ENG.

On the output shaft 25, a second driven gear 35 which meshes with the second driving gear 33 provided on the input shaft 21, and an output gear 36 connected to the differential device D are provided from the motor MOT side to the engine ENG side in this order. Therefore, by engaging the clutch CL, the engine ENG connected to the input shaft 21 and a wheel WR connected to the differential device D are connected such that power can be transmitted and a power transmission path is established in which the power of the engine ENG is transmitted to the wheel WR via the input shaft 21, the clutch CL, the second driving gear 33, the second driven gear 35, the output shaft 25, the output gear 36, and the differential device D. Engine travelling can be performed via this power transmission path. In this case, as described above, since the engine ENG connected to the input shaft 21 and the generator GEN connected to the generator shaft 27 are connected such that power can be transmitted, it is also possible to generate electric power with the generator GEN by the power of engine ENG.

In the motor shaft 29, a third driving gear 37 is provided on a side opposite to the motor MOT to be integrally rotatable. The third driving gear 37 meshes with the second driven gear 35 provided to the output shaft 25. Therefore, the motor MOT connected to the motor shaft 29 and the wheel WR connected to the differential device D are connected such that power can be transmitted and a power transmission path is established in which the power of the motor MOT is transmitted to the wheel WR via the third driving gear 37, the second driven gear 35, the output shaft 25, the output gear 36, and the differential device D. EV travelling can be performed by the motor MOT via this power transmission path.

The vehicle driving device 10 of the embodiment includes two rotary electric machines 50 that is, the motor MOT and the generator GEN. However, the motor MOT and the generator GEN are substantially mirror symmetric with respect to an imaginary intermediate plane between the motor MOT and the generator GEN. Therefore, in the following description, the rotary electric machine 50 will be mainly described using the generator GEN as an example.

Figure 2:
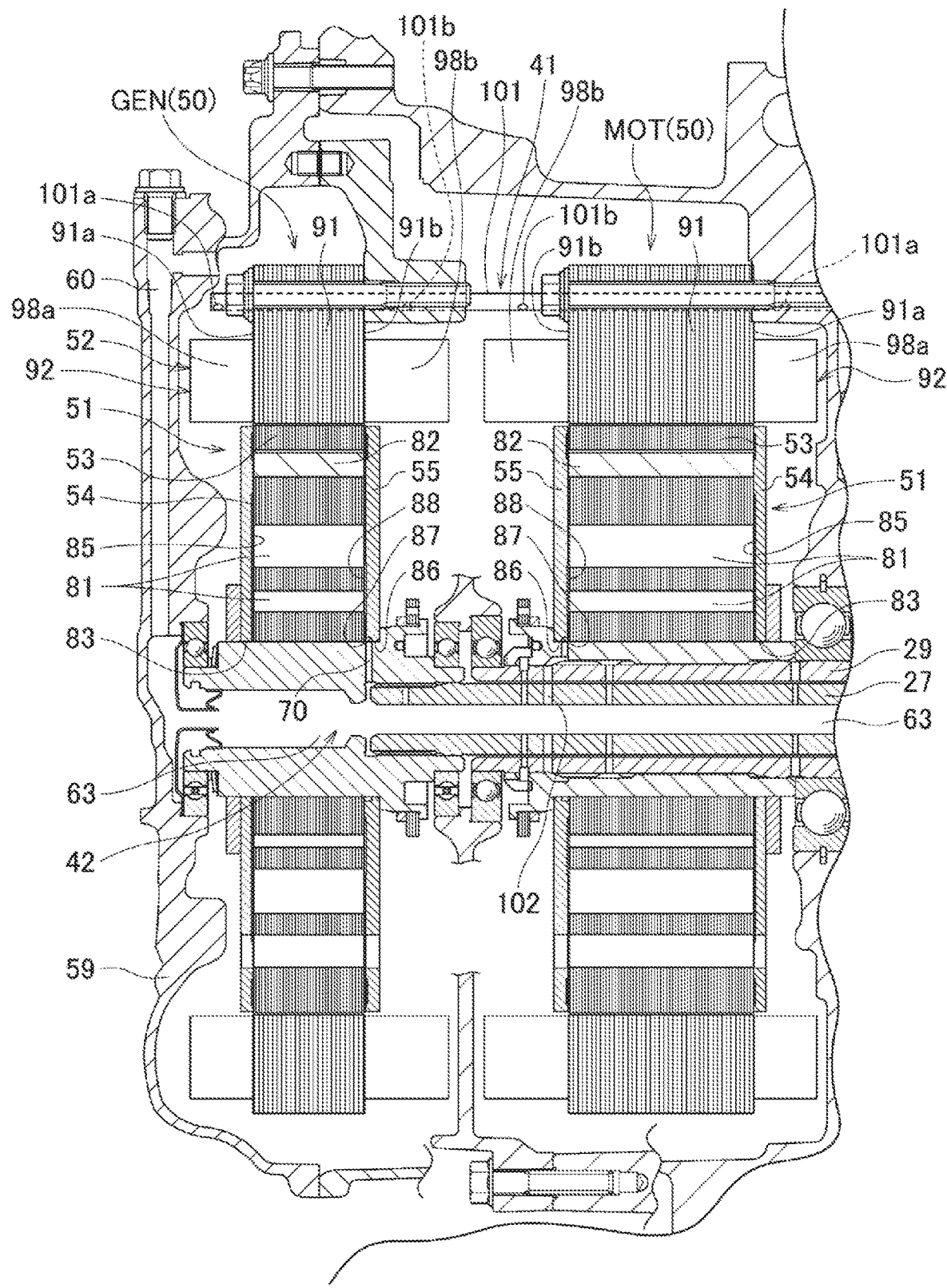
FIG. 2 is a cross-sectional view of the vehicle driving device of FIG. 1.

As illustrated in FIG. 2, the rotary electric machine 50 according to the embodiment is a so-called inner rotor type rotary electric machine which includes a rotor 51 press-fitted and fixed to the generator shaft 27, and a stator 52 arranged to face an outer diameter side of the rotor 51 with a slight gap therebetween. The rotary electric machine 50 includes a first cooling mechanism 41 for supplying a coolant to the stator coil 92 from the outer circumferential side of the stator 52, and a second cooling mechanism 42 for supplying a coolant to the stator coil 92 from the inner circumferential side of the stator 52.

The rotor 51 includes a rotor core 53 supported by the generator shaft 27, a first end plate 54 disposed on one side of the rotor core 53 in the axial direction, and a second end plate 55 disposed on the other side of the rotor core 53 in the axial direction.

In the generator shaft 27, a coolant flow path 63 through which a coolant flows is formed. The coolant flow path 63 extends within the generator shaft 27 in the axial direction and is configured to be able to supply the coolant from the outside. For example, Automatic Transmission Fluid (ATF) is used as the coolant. The coolant flow path 63 is connected to a circulation path 60 formed in a motor housing 59 constituting the case 11.

The rotor core 53 where the generator shaft 27 is press-fitted is constituted by, for example, laminating a plurality of electromagnetic steel plates which are formed by press processing, in the axial direction, and joining, such as crimping and bonding the same. The rotor core 53 includes a plurality of internal flow paths 81 which are formed on the outer diameter side and the inner diameter side to pass through in the axial direction. In addition, magnets 82 are arranged on the outer circumferential portion of the rotor core 53 at equal intervals in the circumferential direction. The magnet 82 is, for example, a permanent magnet such as a neodymium magnet and the N pole and the S pole are aligned at a predetermined pitch to form a magnetic pole portion.

Figure 7:
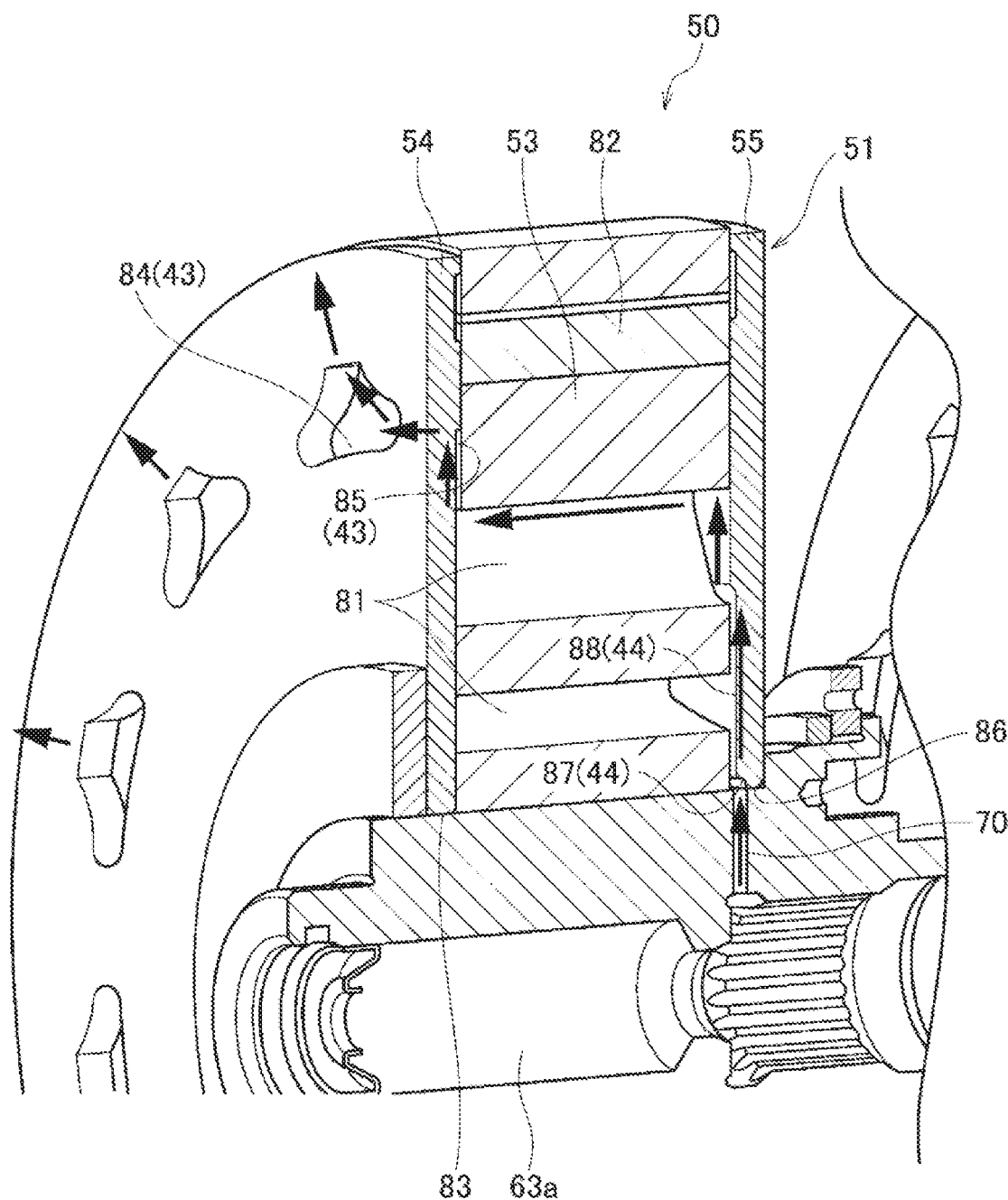
FIG. 7 is a cross-sectional view of the rotary electric machine illustrating the flow of a coolant.

As illustrated in FIGS. 2 and 7, the first end plate 54 is arranged to face the end surface on one side of the rotor core 53 in the axial direction. An insertion hole 83 where the generator shaft 27 is inserted is formed in the center of the first end plate 54, and a plurality of discharge ports 84 are formed at equal intervals in the circumferential direction outward in the radial direction from the insertion hole 83. A radial groove 85 is formed on the inner surface of the first end plate 54 where the rotor core 53 abuts and the radial groove 85 connects the internal flow paths 81 on the outer diameter side and the discharge port 84. The discharge port 84 and the radial groove 85 constitute a discharge portion 43 of the coolant.

The second end plate 55 is arranged to face the end surface on the other side of the rotor core 53 in the axial direction. An insertion hole 86 Where the generator shaft 27 is inserted is formed at the center of the second end plate 55, and an annular groove 87 is formed at a corner portion on the inner diameter side of the insertion hole 86. A radial groove 88 is formed on the inner surface of the second end plate 55 where the rotor core 53 abuts, and the radial groove 88 connects a coolant supply path 70 which passes through the generator shaft 27 in the radial direction, and the internal flow paths 81. That is, the annular groove 87 and the radial groove 88 constitute an introduction portion 44 for introducing the coolant supplied from the coolant flow path 63*a* to the internal flow paths 81.

That is, the second cooling mechanism 42 is constituted of the coolant flow path 63, the coolant supply path 70, the introduction portion 44 (annular groove 87 and radial groove 88), the internal flow paths 81, and the discharge portion 43 (radial groove 85 and discharge ports 84). The second cooling mechanism 42 cools the rotor 51 from the inside and discharges the coolant after cooling the rotor 51 to the radially outside from the discharge ports 84 by a centrifugal force such that the stator coil 92 is cooled from the inner circumference side of the stator 52.

Figure 3:
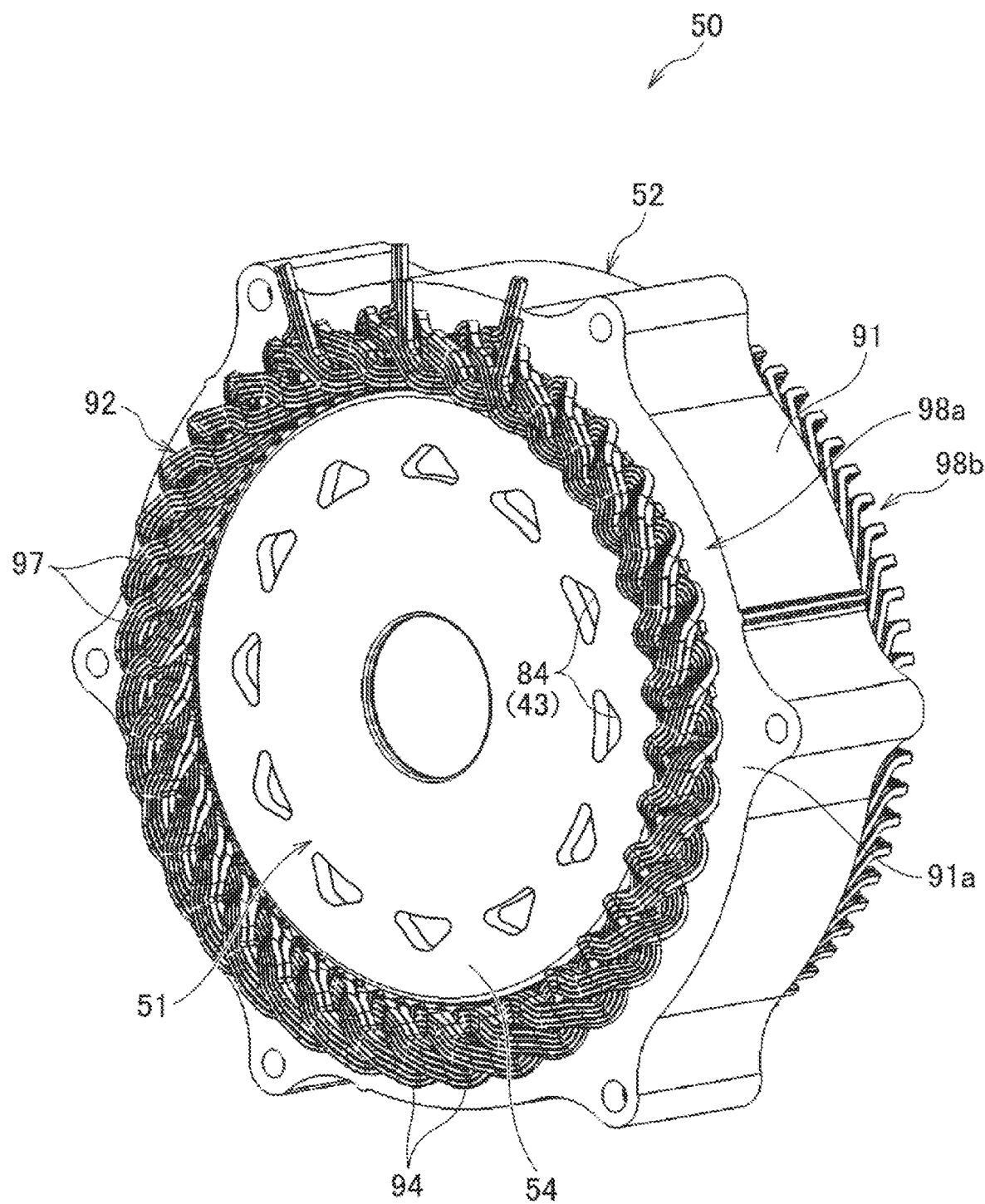
FIG. 3 is a perspective view of the rotary electric machine mounted on the vehicle driving device of FIG. 1.

As illustrated in FIGS. 2 and 3, the stator 52 includes a stator core 91 in which a plurality of slots (not illustrated) penetrating in the axial direction are arranged at a predetermined interval in the circumferential direction, and stator coils 92 of a plurality of phases (for example, a U phase, a V phase, and a W phase) accommodated in the slots.

Figure 4:
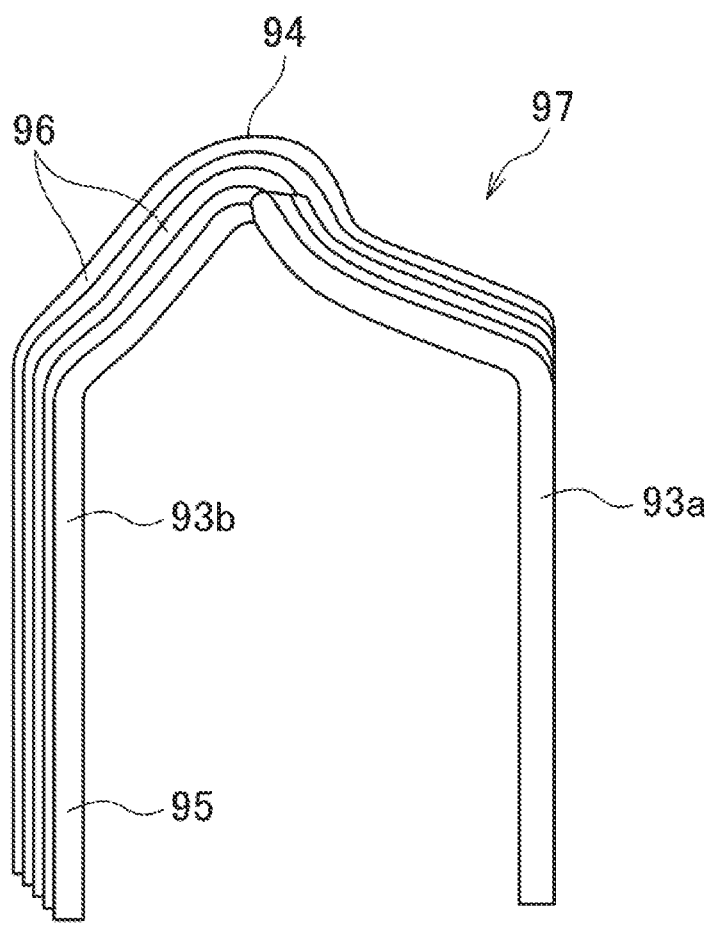
FIG. 4 is a perspective view of a segment coil group in which four segment coils are aligned in a row.

As illustrated in FIG. 4, the stator coil 92 includes a plurality of segment coil groups 97 in which a plurality of substantially U-shaped segment coils 96 constituted of rectangular wires 95 having a rectangular cross section are aligned in a row for every four segment coils 96. Each segment coil 96 includes a pair of leg portions 93*a* and 93*b* extending in parallel to each other, and a connection portion 94 connecting the leg portions 93*a* and 93*b* at one end portions.

Figure 5:
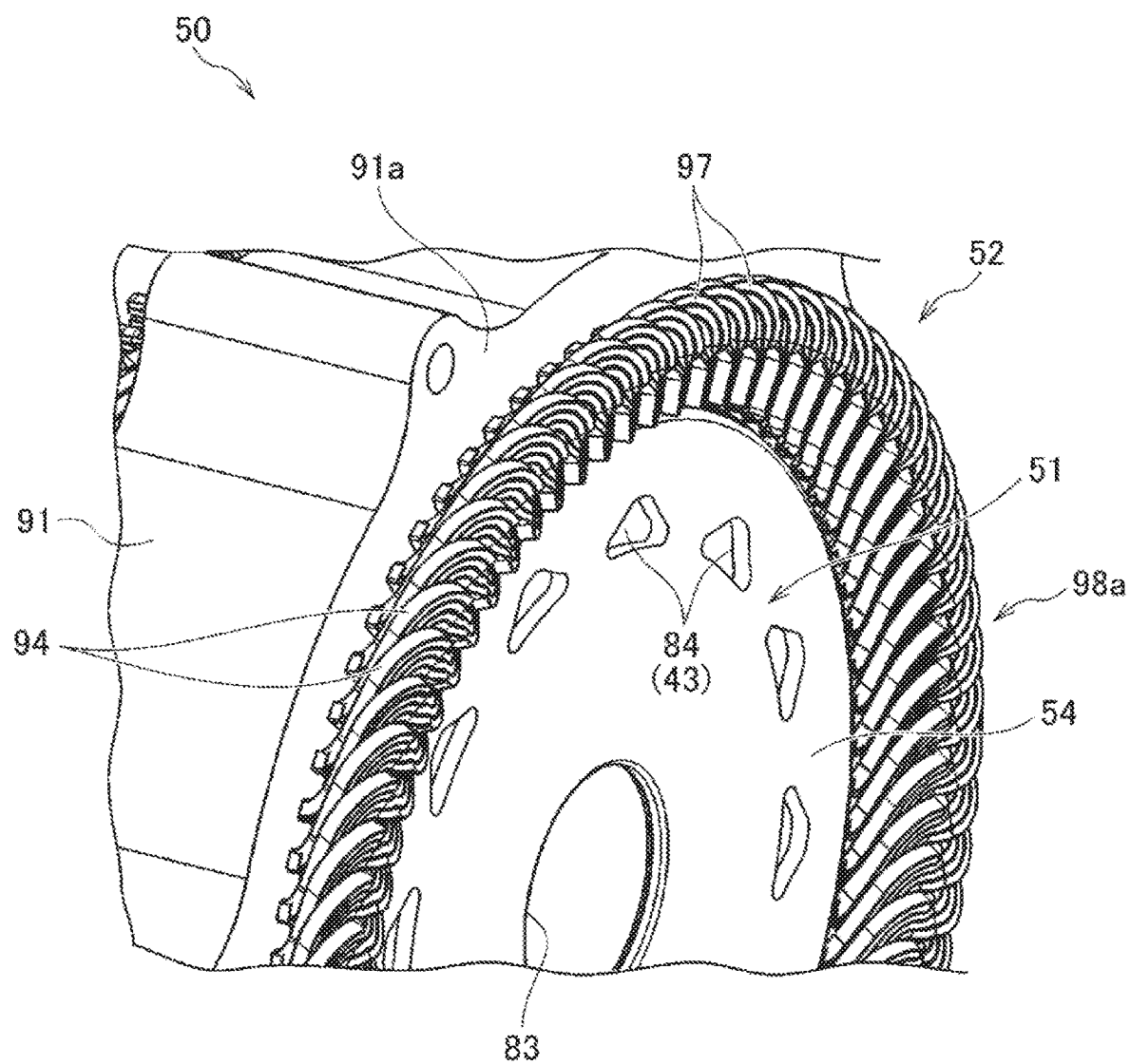
FIG. 5 is a partial perspective view of the rotary electric machine viewed from one coil end (close-side coil end) side.

As illustrated in FIGS. 3 and 5, one leg portion 93*a* of each segment coil 96 is inserted into a radially inner portion of one slot, and the other leg portion 93*b* is inserted into the radially outer portion of the other slot located at a predetermined number of slots away from the one slot.

When a plurality of segment coil groups 97 are arranged in the stator core 91, in the embodiment, eight segment coils 96 are arranged in one slot. Further, on an axial end surface 91*a* on the one end side of the stator core 91 in the axial direction, the connection portions 94 of the plurality of segment coil groups 97 are continuously arranged in the circumferential direction, and the connection portions 94 adjacent to each other in the circumferential direction are arranged so as to partially overlap each other when seen from the axial direction, and accordingly, a close-side coil end 98*a* is formed.

Figure 6:
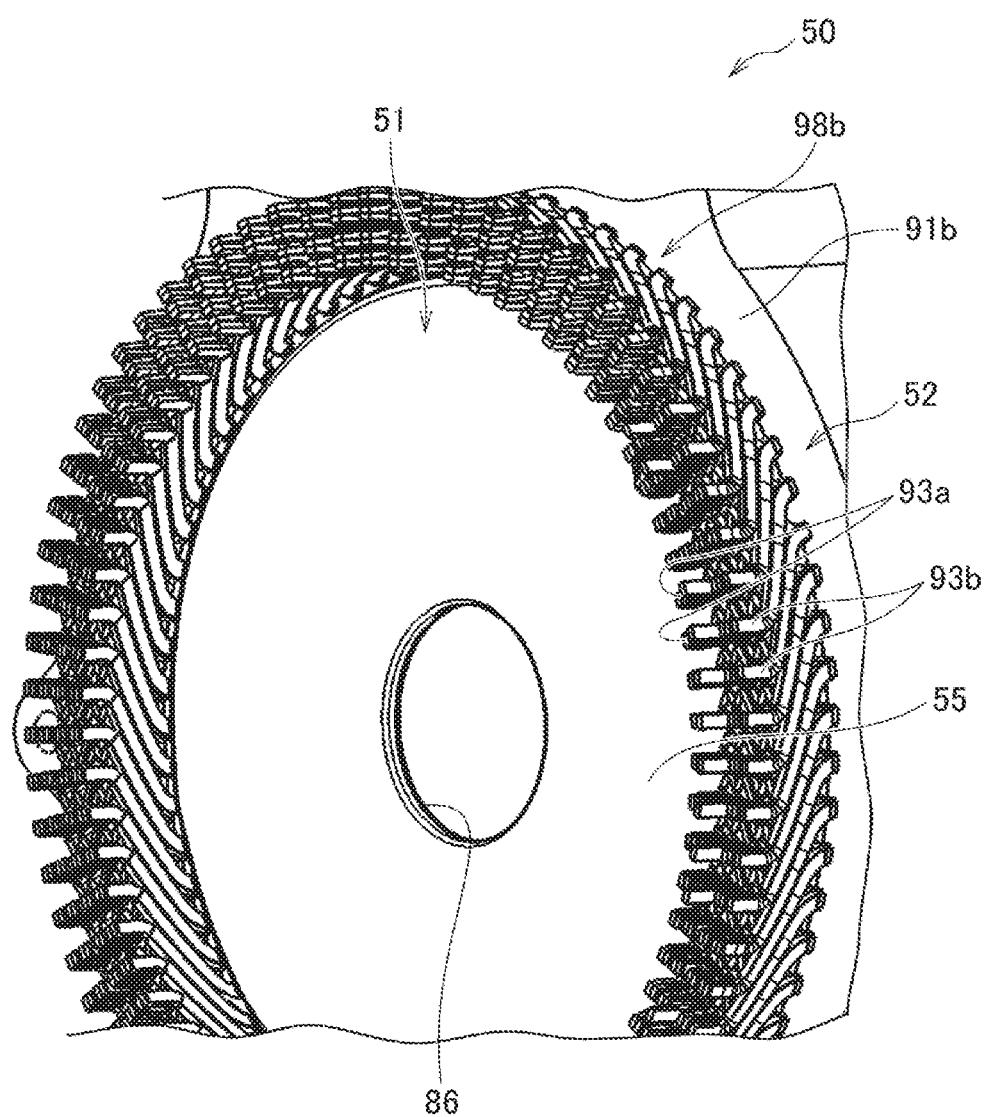
FIG. 6 is a partial perspective view of the rotary electric machine viewed from the other coil end (open-side coil end) side.

Further, as illustrated in FIG. 6, on an axial end surface 91*b* on the other axial end side of the stator core 91, the leg portions 93*a* and 93*b* protruding from the slots are bent in the circumferential direction and joined with the coils of the same phase, and accordingly, an open-side coil end 98*b* is formed. In the embodiment, the segment coil 96 is bent to one side or the other side in the circumferential direction according to the radial position.

Returning to FIG. 3, the close-side coil end 98*a* formed by the connection portion 94 of the segment coil 96 protrudes from the axial end surface 91*a* of the stator core 91 in the axial direction. The open-side coil end 98*b* of the segment coil 96 which is formed by the pair of leg portions 93*a* and 93*b* protrudes from the axial end surface 91*b* of the stator core 91 in the axial direction.

The close-side coil end 98*a* is arranged with the four segment coils 96 in an aligned state, and thus, as illustrated in FIG. 5, the four segment coils 96 are inclined in a state where the segment coils 96 partially overlap in the same direction as seen from the radially inner side. On the other hand, in the open-side coil end 98*b*, as illustrated in FIG. 6, the segment coils 96 having different radial positions are inclined to the opposite side in the circumferential direction, and thus there are many gaps penetrating in the radial direction.

Returning to FIG. 2, the first cooling mechanism 41 includes a plurality of cooling pipes 101 arranged above the stator 52, and a coolant is dropped from drop holes 101*a* and 101*b* provided at positions corresponding to the coil ends 98*a* and 98*b* to the coil ends 98*a* and 98*b* of the stator coil 92 to cool the stator coil 92.

Figure 8:
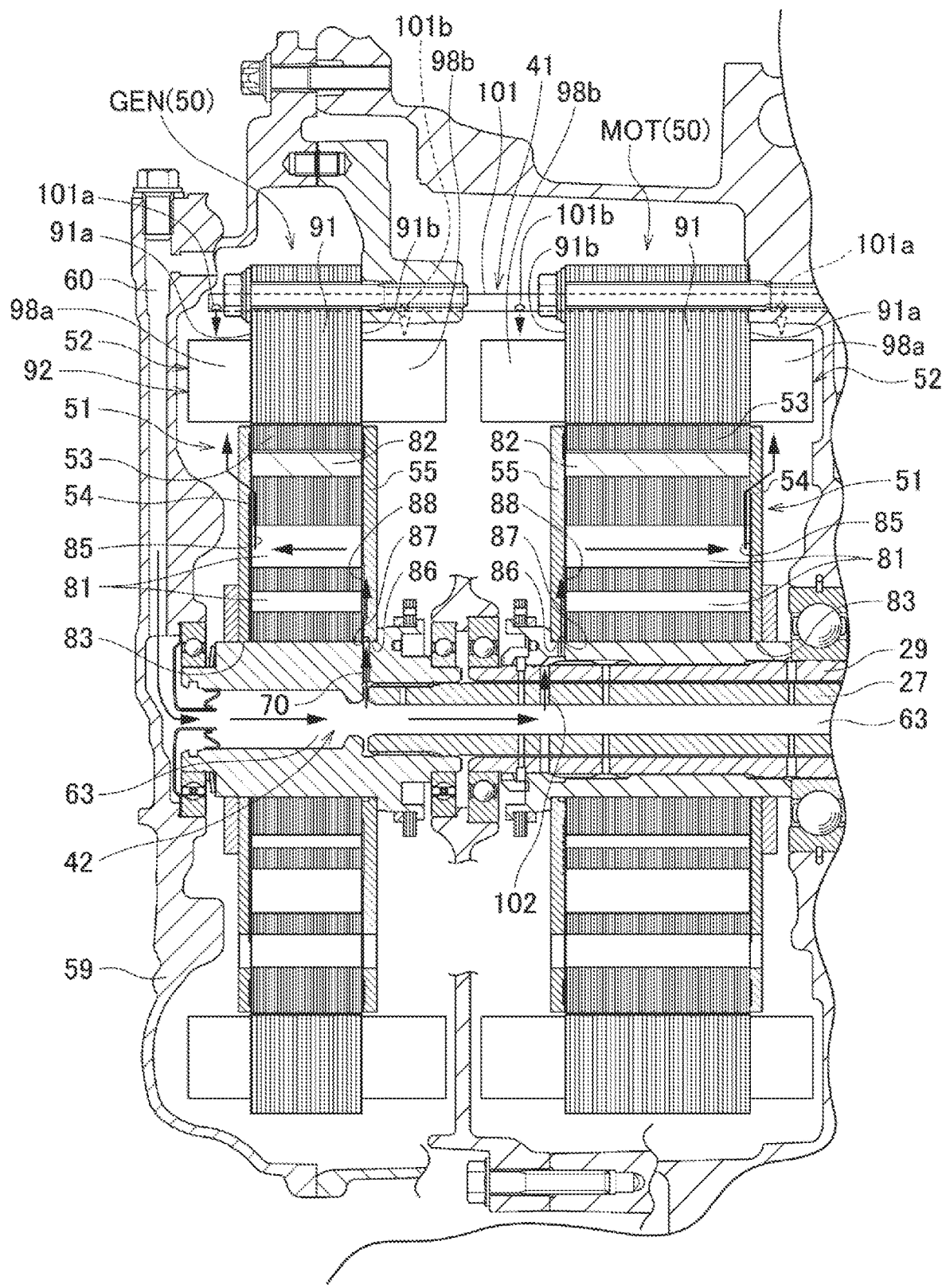
FIG. 8 is a cross-sectional view of the vehicle driving device illustrating the flow of the coolant.

Next, the cooling operation of the rotary electric machine 50 will be described with reference to FIGS. 7 and 8. The coolant is pressure-fed by a coolant pump (not illustrated), and the coolant is dropped from the drop holes 101*a* and 101*b* of the cooling pipes 101, which are arranged above the stator 52 to constitute the first cooling mechanism 41, to the coil ends 98*a* and 98*b*, thereby cooling the coil ends 98*a* and 98*b* of the stator coil 92 from the outer circumferential side.

Herein, only with the cooling by the first cooling mechanism 41, the temperature of the close-side coil end 98*a* formed by the connection portion 94 tends to locally increase as described above. That is, when compared with the open-side coil end 98*b* formed by the leg portions 93*a* and 93*b*, the coolant is liable to be guided to a specific location in the close-side coil end 98*a*, and thus temperature distribution is likely to occur in the circumferential direction.

In the rotary electric machine 50 of the embodiment, the coolant pressure-fed by the coolant pump (not illustrated) is supplied to the second cooling mechanism 42 to cool the rotor 51 from the inner circumferential side. Further, the coolant after cooling the rotor 51 is discharged from the discharge ports 84 and is blown away radially outward by the centrifugal force to cool the stator coil 92 from the inner circumferential side.

Specifically, the coolant pressure-fed by the coolant pump (not illustrated) is supplied to the generator shaft 27 via the circulation path 60 formed in the motor housing 59. The coolant supplied to the coolant flow path 63 is supplied to the coolant supply path 70 passing through the generator shaft 27 in the radial direction.

The coolant of the coolant supply path 70 is supplied to the internal flow paths 81 through the annular groove 87 and the radial groove 88 (introduction portion 44) of the second end plate 55 by the centrifugal force acting on the coolant, and then the coolant flows in the axial direction within the internal flow paths 81 to cool the rotor core 53 from the inside.

The coolant further flows from the internal flow paths 81 on the outer diameter side to the radial groove 85 on the first end plate 54 and is discharged from the discharge ports 84

(discharge portion 43) to the outside of the rotor 51. The coolant is further blown away radially outward by the centrifugal force and adheres to the inner circumferential side of the close-side coil end 98a of the stator coil 92 to cool the stator coil 92 from the inner circumferential side.

The coolant which cools the rotor 51 and the stator 52 by the first cooling mechanism 41 and the second cooling mechanism 42 is recirculated by the coolant pump, and the coolant cools the rotor 51 from the inside and cools the stator 52 from the outer circumferential side and the inner circumferential side.

By disposing the discharge ports 84 only in the first end plate 54 on the same side as the close-side coil end 98a formed by the connection portion 94 where the temperature distribution is likely to occur only with the dropping of the coolant by the first cooling mechanism 41, the close-side coil end 98a is also cooled from the inner circumferential side by the second cooling mechanism 42. As a result, in the first cooling mechanism 41, the coolant is also supplied to a part of the close-side coil end 98a, where the coolant is hardly spread, by the second cooling mechanism 42, and thus it is possible to appropriately spread the coolant to the close-side coil end 98a and the open-side coil end 98b.

Further, the discharge ports 84 are not formed in the second end plate 55 on the same side as the open-side coil end 98b where the coolant is appropriately spread only with the dropping of the coolant by the first cooling mechanism 41, and thus it is possible to reduce the supply amount of the coolant of the second cooling mechanism 42 and to reduce the pump capacity and the pump size.

If necessary, the discharge ports 84 may be provided in the second end plate 55 as well to cool the open-side coil end 98b from the inner circumferential side. Even in this case, the amount of the coolant supplied from the second cooling mechanism 42 is set to be larger in the close-side coil end 98a than in the open-side coil end 98b.

Since the close-side coil end 98a is also cooled from the inner circumferential side by the second cooling mechanism 42, it is possible to reduce the amount of the coolant supplied from the first cooling mechanism 41 to the close-side coil end 98a. That is, the supply amount of the coolant supplied from the first cooling mechanism 41 to the close-side coil end 98a may be smaller than the supply amount of the coolant supplied from the first cooling mechanism 41 to the open-side coil end 98b. Reduction of the amount of the coolant supplied to the close-side coil end 98a in the first cooling mechanism 41 is achieved by reducing the diameter of the hole of the drop hole 101a of the cooling pipes 101, reducing the number of drop holes 101a, or the like.

Also, cooling of the motor MOT, which is the other rotary electric machine 50, is the same as that of the generator GEN, and the coolant is supplied from the drop holes 101a and 101b of the cooling pipes 101 to the coil ends 98a and 98b of the stator coil 92 of the motor MOT to cool the stator coil 92 from the outer circumferential side. The coolant supplied to the coolant flow path 63 of the generator shaft 27 is introduced into the introduction portion 44 and the internal flow paths 81 provided in the rotor 51 of the motor MOT via a coolant supply path 102 formed in the generator shaft 27 and the motor shaft 29 in the radial direction to cool the rotor 51 of the motor MOT from the inside. Further, the coolant is blown radially outward from the discharge portion 43 by the centrifugal force to cool the close-side coil end 98a of the stator coil 92 of the motor MOT from the inner circumferential side.

As a result, the coil ends 98a and 98b of the stator coil 92 are cooled from the outer circumferential side by the first cooling mechanism 41, and the close-side coil end 98a is cooled from the inner circumferential side as well by the second cooling mechanism 42. Therefore, even in the motor MOT which is the other rotary electric machine 50, it is possible to appropriately spread the coolant to the close-side coil end 98a and the open-side coil end 98b.

The embodiment described above can be appropriately modified, improved, and the like.

In the meantime, at least the following subject matters are described in this specification. Although the corresponding constituent element or the like in the embodiment described above is illustrated in parentheses, the invention is not limited thereto.

(1) A rotary electric machine electric machine 50) includes:

a rotor (rotor 51);

a stator (stator 52) which is disposed on an outer circumferential side of the rotor and includes a stator core (stator core 91) and a coil (stator coil 92);

a first cooling mechanism (first cooling mechanism 41) which supplies a coolant to the coil from an outer circumferential side of the stator; and a second cooling mechanism (second cooling mechanism 42) which supplies a coolant to the coil from an inner circumferential side of the stator, wherein the coil includes a plurality of segment coils (segment coils 96), each including a pair of leg portions (leg portions 93a and 93b) and a connection portion (connection portion 94) connecting one end sides of the pair of leg portions, wherein a close-side coil end (close-side coil end 98a) constituted by the connection portion is provided on one end side of the stator core, wherein an open-side coil end (open-side coil end 98b) constituted by the leg portions is provided on the other end side of the stator core, and wherein a supply amount of the coolant supplied from the second cooling mechanism is larger to the close-side coil end than to the open-side coil end.

According to (1), although the first cooling mechanism which supplies the coolant to the coil from the outer circumferential side of the stator has difficulty in spreading the coolant in the close-side coil end constituted by the connection portion, by actively supplying the coolant to the close-side coil end with the second cooling mechanism which supplies the coolant to the coil from the inner circumferential side of the stator, it is possible to appropriately spread the coolant to the close-side coil end and the open-side coil end.

(2) A rotary electric machine (rotary electric machine 50) includes:

a rotor (rotor 51); a stator (stator 52) which is disposed on an outer circumferential side of the rotor and has a stator core (stator core 91) and a coil (stator coil 92);

a first cooling mechanism (first cooling mechanism 41) which supplies a coolant to the coil from an outer circumferential side of the stator; and a second cooling mechanism (second cooling mechanism 42) which supplies a coolant to the coil from an inner circumferential side of the stator, wherein the coil includes a plurality of segment coils (segment coils 96), each including a pair of leg portions (leg portions 93a and 93b) and a connection portion (connection portion 94) connecting one end sides of the pair of leg portions, wherein a close-side coil end (close-side coil end 98*a*) constituted by the connection portion is provided on one end side of the stator core, wherein an open-side coil end (open-side coil end 98*b*) constituted by the leg portions is provided on the other end side of the stator core, and wherein a coolant is supplied from the second cooling mechanism only to the close-side coil end.

According to (2), although the first cooling mechanism which supplies the coolant to the coil from the outer circumferential side of the stator has difficulty in spreading the coolant in the close-side coil end constituted by the connection portion, by actively supplying the coolant to the close-side coil end with the second cooling mechanism supplying the coolant to the coil from the inner circumferential side of the stator, it is possible to appropriately spread the coolant to the close-side coil end and the open-side coil end.

(3) In the rotary electric machine according to (1) or (2), a supply amount of the coolant supplied from the first cooling mechanism is smaller to the close-side coil end than to the open-side coil end.

According to (3), by actively supplying the coolant to the close-side coil end constituted by the connection portion with the second cooling mechanism which supplies the coolant to the coil from the inner circumferential side of the stator, the amount of the coolant supplied to the close-side coil end 98*a* can be reduced in the first cooling mechanism which supplies the coolant to the coil from the outer circumferential side of the stator.

(4) The rotary electric machine according to any one of (1) (3), includes:

a rotor shaft (generator shaft 27) which is connected to the rotor so as to be integrally rotatable and provided with a coolant flow path (coolant flow path 63) through which a coolant flows, wherein the rotor includes a rotor core (rotor core 53) and a pair of end plates (end plates 54 and 55) disposed on both end surfaces of the rotor core, and wherein the second cooling mechanism supplies a coolant to the coil from a discharge port (discharge ports 84) of the end plate via an internal flow path (internal flow paths 81) formed in the rotor core from the coolant flow path.

According to (4), the second cooling mechanism is a so-called shaft center cooling mechanism, and the coolant flows through the internal flow path formed in the rotor core, thereby cooling the rotor core as well.

(5) In the rotary electric machine according to (4), a discharge portion (discharge portion 43) for supplying the coolant to the coil is provided in the end plate located on the one end side, and an introduction portion (introduction portion 44) for introducing the coolant supplied from the coolant flow path to the internal flow path of the rotor core is provided in the end plate located on the other end side.

According to (5), as the coolant flows from the other end side to the one end side, it is possible to cool the rotor core over the entire region in the axial direction.

The invention claimed is:

1. A rotary electric machine comprising:
   a rotor;
   a stator which is disposed on an outer circumferential side of the rotor and includes a stator core and a coil;
   a first cooling mechanism which supplies a coolant to the coil from an outer circumferential side of the stator; and
   a second cooling mechanism which supplies a coolant to the coil from an inner circumferential side of the stator,
   wherein the coil includes a plurality of segment coils, each including a pair of leg portions, and a connection portion connecting one end sides of the pair of leg portions,
   wherein a close-side coil end constituted by the connection portion is provided on one end side of the stator core,
   wherein an open-side coil end constituted by the leg portions is provided on the other end side of the stator core, and
   wherein a supply amount of the coolant supplied from the second cooling mechanism is larger to the close-side coil end than to the open-side coil end.

2. The rotary electric machine according to claim 1, wherein a supply amount of the coolant supplied from the first cooling mechanism is smaller to the close-side coil end than to the open-side coil end.

3. The rotary electric machine according to claim 1, further comprising:
   a rotor shaft which is connected to the rotor so as to be integrally rotatable and provided with a coolant flow path through which a coolant flows,
   wherein the rotor includes a rotor core and a pair of end plates disposed on both end surfaces of the rotor core, and
   wherein the second cooling mechanism supplies a coolant to the coil from a discharge port of the end plate via an internal flow path formed in the rotor core from the coolant flow path.

4. The rotary electric machine according to claim 3, wherein a discharge portion for supplying the coolant to the coil is provided in the end plate at which the close-side coil end is located, and
   wherein an introduction portion for introducing the coolant supplied from the coolant flow path to the internal flow path of the rotor core is provided in the end plate located at the open-side coil end.

5. A rotary electric machine comprising:
   a rotor;
   a stator which is disposed on an outer circumferential side of the rotor and includes a stator core and a coil;
   a first cooling mechanism which supplies a coolant to the coil from an outer circumferential side of the stator; and
   a second cooling mechanism which supplies a coolant to the coil from an inner circumferential side of the stator,
   wherein the coil includes a plurality of segment coils, each including a pair of leg portions and a connection portion connecting one end sides of the pair of leg portions,
   wherein a close-side coil end constituted by the connection portion is provided on one end side of the stator core,
   wherein an open-side coil end constituted by the leg portions is provided on the other end side of the stator core, and
   wherein a coolant is supplied from the second cooling mechanism only to the close-side coil end.

6. The rotary electric machine according to claim 5, wherein a supply amount of the coolant supplied from the first cooling mechanism is smaller to the close-side coil end than to the open-side coil end.

7. The rotary electric machine according to claim 5, further comprising:
   a rotor shaft which is connected to the rotor so as to be integrally rotatable and provided with a coolant flow path through which a coolant flows, wherein the rotor includes a rotor core and a pair of end plates disposed on both end surfaces of the rotor core, and wherein the second cooling mechanism supplies a coolant to the coil from a discharge port of the end plate via an internal flow path formed in the rotor core from the coolant flow path.

8. The rotary electric machine according to claim 7, wherein a discharge portion for supplying the coolant to the coil is provided in the end plate at which the close-side coil end is located, and wherein an introduction portion for introducing the coolant supplied from the coolant flow path to the internal flow path of the rotor core is provided in the end plate located at the open-side coil end.

* * * * *